United States Patent [19]

Miyagawa

[11] 4,075,401
[45] Feb. 21, 1978

[54] GAS-DISCHARGING PASSAGE OF STORAGE BATTERY AND MOLDING METHOD THEREOF

[75] Inventor: Shiro Miyagawa, Suita, Japan

[73] Assignee: Miyagawa Kasei Industry Co., Ltd., Osaka, Japan

[21] Appl. No.: 736,554

[22] Filed: Oct. 28, 1976

[30] Foreign Application Priority Data

| Feb. 13, 1976 | Japan | 51-15575[U] |
| Dec. 27, 1975 | Japan | 51-179077[U] |
| Feb. 13, 1976 | Japan | 51-16919[U] |
| Feb. 13, 1976 | Japan | 51-16920[U] |
| Mar. 31, 1976 | Japan | 51-40622[U] |
| June 16, 1976 | Japan | 51-79208[U] |
| July 23, 1976 | Japan | 51-98892[U] |
| Aug. 19, 1976 | Japan | 51-112390[U] |

[51] Int. Cl.² .......................................... H01M 2/12
[52] U.S. Cl. .............................. 429/89; 429/82
[58] Field of Search .................... 429/89, 82

[56] References Cited

U.S. PATENT DOCUMENTS

| 1,613,955 | 1/1927 | Lesley | 429/89 |
| 2,223,226 | 11/1940 | Rieser | 429/82 |
| 2,994,731 | 8/1961 | Buskirk et al. | 429/89 |
| 3,020,328 | 2/1962 | Jones | 429/89 |

FOREIGN PATENT DOCUMENTS

| 1,496,263 | 4/1969 | Germany | 429/89 |

Primary Examiner—Donald L. Walton
Attorney, Agent, or Firm—W. G. Fasse; W. W. Roberts

[57] ABSTRACT

A gas-discharging passage for a storage battery is adapted to discharge the gas which is produced inside the storage battery through a cylindrical body. The gas discharging passage is provided directly in the cover of the storage battery, or in the plug for electrolyte hole of the storage battery. A plurality of tongue-like pieces which are molded integrally with the cylindrical body are projected inwardly and inclined downwardly on the inner peripheral wall of the cylindrical body, whose axis is directed vertically. Thus, the passage shape formed inside the cylindrical body is adapted to advantageously prevent electrolyte from remaining inside the cylindrical body and from leaking through the cylindrical body.

7 Claims, 39 Drawing Figures

GAS-DISCHARGING PASSAGE OF STORAGE BATTERY AND MOLDING METHOD THEREOF

BACKGROUND OF THE INVENTION

1. Field of the Invention

This invention relates to a gas-discharging passage of storage battery and a molding method thereof. More particularly, the present invention relates to improvements in the construction of a gas-discharging passage of the storage battery which is formed with, especially, a proper molding material through a molding operation, in the productivity of the molding method, and in the prevention of the electrolyte leakage.

2. Description of the Prior Art

Conventionally, a passage was formed in the storage battery to discharge the gas produced during a charging operation. The passage was designed to prevent the electrolyte leakage, which was caused due to the vibration of the storage battery or the oscillation thereof, or the evaporated electrolyte from being scattered outwardly. Accordingly, various passage shapes were proposed. Most of the conventional passage shapes were complicated or suitable barriers were provided in the passage to avoid the above disadvantages. Accordingly, most of such passages became complicated in construction. Complexity was involved in the processes of manufacturing, since a plurality of parts were required to be molded individually and then to be integrated with bonding agent, etc.

The integration by the use of the bonding agent, etc. will be described hereinafter. Olefin resin such as polypropylene resin which is superior in oil resistance and chemical resistance is recently used as an electric cell material for the storage battery. However, for example, the polypropylene, etc. have an extremely inferior adhesive property when the bonding agent is used for them. Accordingly, when such synthetic resin as the polypropylene resin which is inferior in adhesive property is used as the electric cell, it is advantageous to avoid the assembling operation with bonding agent if possible or completely during the manufacturing processes. As apparent from the foregoing description, when the gas-discharging passage of the storage battery which is made of such synthetic resin as the polypropylene resin is formed, the assembling process in which a plurality of parts are molded individually and thereafter are integrated through the bonding should be avoided as much as possible.

In addition to the problems caused during the manufacturing processes described hereinabove, the electrolyte may scatter due to the vibration of the storage battery or the oscillation thereof or the evaporated electrolyte may be condensed where the passage for gas-discharging is narrow or complicated. Thus, the electrolyte may remain in the passage and may be forced out through the pressure of the gas produced during charging operation, thus resulting in leakage of the electrolyte. Accordingly, it is desirable to provide such passage shape as the electrolyte in the gas-discharging passage may drip to return to the electric battery.

SUMMARY OF THE INVENTION

The present invention can eliminate the above problems. The present invention provides the gas discharging passage of the storage battery and the molding method thereof, which can sufficiently prevent the electrolyte from leaking and are easier to manufacture.

The gas discharging passage of the storage battery in accordance with the present invention is molded integrally with a molding material which is properly provided with substantial elasticity. For example, olefin resin or its mixture is used as the molding material. The discharging passage includes a cylindrical portion whose axis is directed vertically, and, for example, a through-hole is formed, for discharging the gas, in the upper end face of the cylindrical portion. A screening members which are molded simultaneously with the molding operation of the cylindrical portion are projected inwardly from the cylindrical portion. For example, the screening members are tongue-like pieces or brush-shaped mass of hair-like materials extending from the inner wall of the cylindrical portion or the lower end edge thereof. According to the molding method of the present invention, the gas discharging passage of the storage battery wherein the screening members are projected inwardly from the cylindrical portion is integrally molded, the passage including the cylindrical portion, at least one end face of which being closed. A molding material which is properly provided with substantial elasticity is used. First, a female mold which correlates to the outer wall shape of the cylindrical portion, and a male mold which correlates to the inner wall shape of the cylindrical portion are prepared. Particularly, a gap is provided in the male mold for the molding operation of the screening members. The molding material is injected into a closed gap which has been formed through assembling the female mold with the male mold. When the injected molding material has been solidified substantially, the female mold is released and the male mold is pulled out, by force, in the opening side direction by the use of the elasticity of the molding material, thereby to provide the gas-discharging passage. A time when the molding material has been solidified substantially does not always mean a time when the hardening of the material has been attained completely, but may be a time when the fluidity of material has disappeared during the hardening process of the material. For example, in a case where polypropylene resin is used as the molding material, it is better to pull out the male mold by force when the resin is soft at high temperature, instead of when the resin is cooled completely up to room temperature and is hardened, since the elasticity of the molding material can be used more properly. Thus, advantageous molding operation can be effected at that time.

The gas-discharging passage of the storage battery and the molding method thereof in accordance with the present invention relates to the simultaneous and integral molding of the cylindrical portion and a portion projecting inwardly from the cylindrical portion, which has been considered as a difficult point due to conventionally impossible pulling-out operation of the male mold, namely, a projected portion extending in the direction which is not parallel to the axis of the cylindrical portion. The realization of such molding and molding method as described hereinabove is very significant.

A primary object of the invention is to provide the gas discharging passage of the storage battery and the molding method thereof, which are characterized by the manufacturing process simplified through the integral molding operation.

Another object of this invention is to provide a gas discharging passage of the storage battery and the molding method thereof, which can prevent the electrolyte leakage advantageously.

The above and other objects and features of the invention will become more apparent hereinafter from a consideration of the following description taken in connection with the accompanying drawings.

BRIEF DESCRIPTION OF THE DRAWINGS

FIGS. 1 and 2 each show one embodiment of the present invention, wherein

FIGS. 3, 4 and 5 each show the essential parts of the storage battery shown in FIGS. 1 and 2, wherein

FIGS. 6, 7 and 8 each are illustrated views of a plug for electrolyte hole of another embodiment of the present invention, wherein

FIGS. 14 and 15 show a modified version of the embodiment of FIGS. 6 through 8, wherein

FIGS. 16 and 17 show a second typical embodiment of this invention, wherein

FIGS. 18, 19 and 20 show a first modified version of the embodiment of FIGS. 16 and 17, wherein

FIGS. 21 and 22 each show the plug for electrolyte hole for illustrating a second modified version, wherein

FIGS. 23 and 24 each show the plug for electric hole for illustrating a third modified version, wherein

FIGS. 25, 26 and 27 each show an umbrella-shaped member used in the embodiment of a third modified version, wherein

FIGS. 28, 29 and 30 show an umbrella-shaped member in another embodiment, wherein

FIGS. 32 and 33 each show one embodiment of an electrolyte hole 121 for illustrating a fifth modified version, wherein

FIGS. 34 and 35 show the condition of the electrolyte hole 121, which is shown in FIGS. 32 and 33, closed by means of the plug for electrolyte hole 122, wherein

FIGS. 38 and 39 show a plug for electrolyte hole for illustrating the third typical embodiment of the present invention, wherein

DESCRIPTION OF THE PREFERRED EMBODIMENT

The gas discharging passage of the present invention may be disposed directly in the cover of the storage battery cell or is the plug for electrolyte hole for supplying the electrolyte. in any case, the gas discharging passage of the present invention is located on the top face wall of the storage battery facing oppositely to the liquid level of the electrolyte, and the existing cylindrical portion (for example, a cylindrical shaft portion which engages the opening of the plug for electrolyte hole) or the cylindrical portion provided mainly as a gas discharging passage is one of the components of the gas discharging passage. First, a case where one embodiment of the gas discharging passage is directly provided in the cover portion of the electric cell will be described hereinafter.

Figure 1:
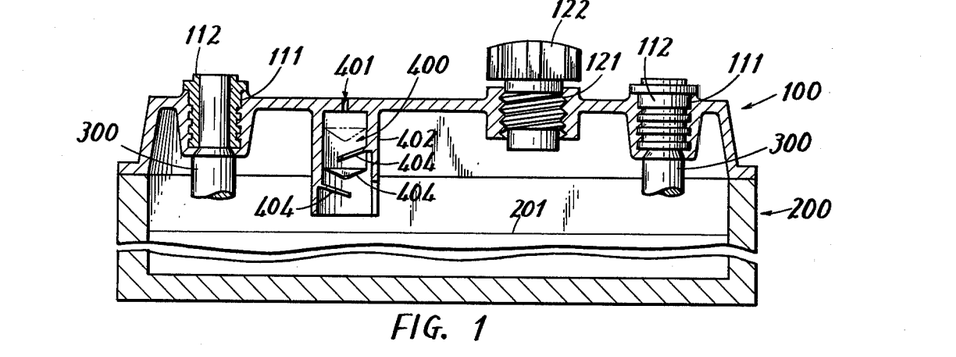
FIG. 1 is a cross-sectional view of a storage battery taken along a line I — I of FIG. 2
Figure 2:
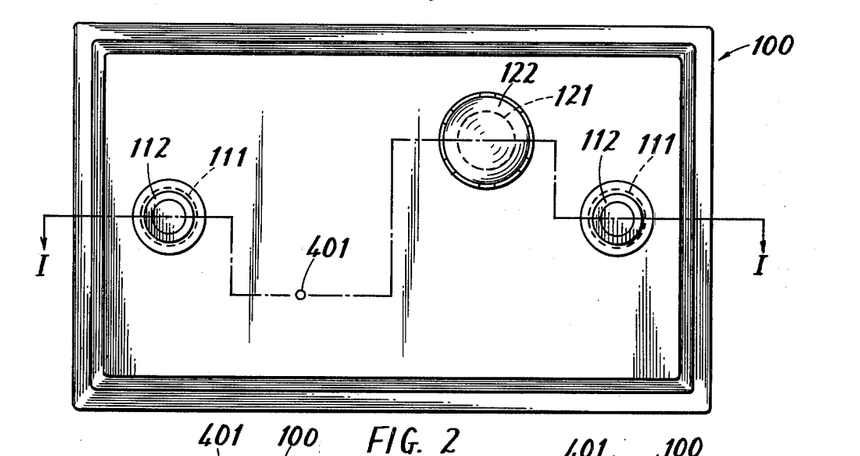
FIG. 2 is a plan view of the storage battery.
Figure 3:
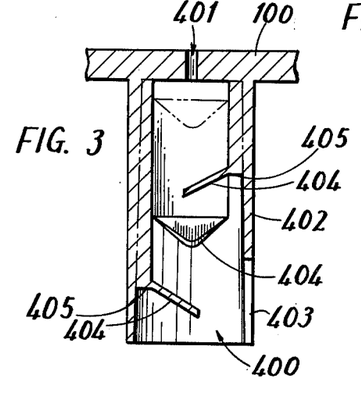
FIG. 3 is a cross-sectional view taken along a line III — III of FIG. 5.
Figure 4:
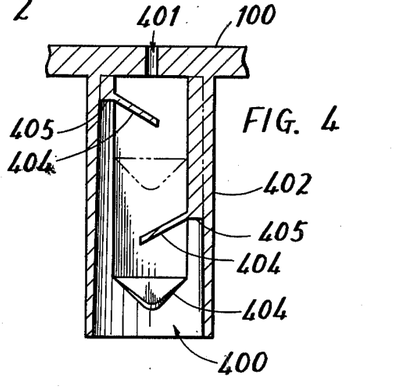
FIG. 4 is a cross-sectional view along a line IV — IV of FIG. 5
Figure 5:
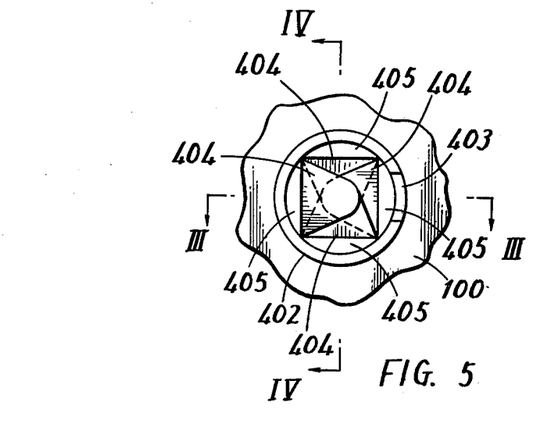
FIG. 5 is a bottom view thereof.

FIGS. 1 and 2 show one embodiment of the present invention. FIG. 1 is a cross-sectional view of the storage battery taken along a line I — I of FIG. 2. FIG. 2 is a plan view of the storage battery. FIGS. 3, 4 and 5 each show the essential parts of the storage battery shown in FIGS. 1 and 2. FIG. 3 is a sectional view taken along a line III — III of FIG. 5. FIG. 4 is a sectional view taken along a line of IV — IV of FIG. 5. FIG. 5 is a bottom view thereof.

Referring to FIGS. 1 and 2, the cover 100 of the storage battery is connected with the electric cell body of the storage battery by a method of thermal adhesion operation, etc. to constitute the electric cell portion of the storage battery. For example, two through-holes 111 are formed in the cover 100 for receiving a rod 300 which connects to a plate (not shown), and a proper sealing member 112 is filled into the through-holes to keep the rod 300 liquid-tight. The end portion of the rod 300 becomes an electrical terminal of the storage battery. Also, the electrolyte hole 121 is provided in the cover 100 for supplying the electrolyte. The opening is normally closed tightly through screwing of the plug for electrolyte hole 122. Furthermore, a through-hole 401 which is one element of the gas discharging passage 400 is provided in the cover 100. A cylindrical portion 402 is provided on the under side of the cover 100 which corresponds to the position of the through-hole 401. A special construction which is the summary of this invention is provided on the inner side of the cylindrical portion 402. The passage to the through-hole 401 is so complicated as to prevent the electrolyte leakage, etc. The construction of such cylindrical portion 402 will be described hereinafter.

Referring to FIGS. 1 through 5, a slit 403 is cut deep upwardly from the lower end edge of the cylindrical portion 402. The slit 403 becomes a passage for gas when the electrolyte (whose level is shown at 201) has closed the lower end face of the cylindrical portion 402. The inner face side of the cylindrical portion 402 is square in section. Tongue-like pieces 404, . . . serving as screening members are alternately projected from the four faces, respectively, of approximately square-pillar-like space formed therein. The tongue-like pieces 404 are adapted to face downwardly by, for example, about 30 degrees from a vertical direction with respect to the inner side, and the four tongue-like pieces 404 are selected in their projecting condition to mutually overlap each other (but they are not in contact against each other). The overlapping condition of the four tongues is shown particularly in FIG. 5. Thus, a straight-line passage from the lower opening of the cylindrical portion 402 to the through-hole 401 is shut off. In short, the face leading to the lower opening from the respective root portions of the tongue-like pieces 404 is cut to a proper depth to form stage portions 405 therein. The tongue-like pieces 404 are tapered, respectively.

The cylindrical portion 402 and the tongue-like pieces 404 of the above-described gas discharging passage 400 are molded integrally and simultaneously. The molding method will be described in detail.

According to the embodiment of FIGS. 1 through 5, the passage to the through-hole 401 is not straight. The electrolyte is prevented from leaking outside due to the vibration of the storage battery or the oscillation thereof. The electrolyte which were condensed in the electrolyte-hole plug or the electrolyte which wetted the inside of the cylindrical portion 402 due to the vibration, etc, are adapted to drip along the inclined faces of the tongue-like pieces 404. Also, the slit 403 serves to drop the electrolyte advantageously. The gas discharging passage 400 can be produced simply by one molding process, as to be described subsequently. No assembling process, etc. are required, thus resulting in increased productivity.

Then, a case where the gas discharging passage of this invention is provided in the electrolyte-hole plug will be described hereinafter. As described hereinabove, when no gas discharging passage is not provided directly in the cover 100 portion, the gas discharging passage is provided in, for example, the electrolyte-hole plug (which is shown at numeral 122 in FIG. 1) for supplying the electrolyte. This is adopted in many small-sized storage batteries.

Figure 6:
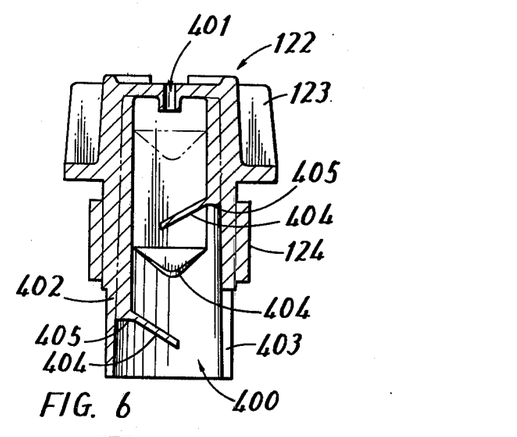
FIG. 6 is a cross-sectional view taken along a line VI — VI of FIG. 8.
Figures 7, 8:
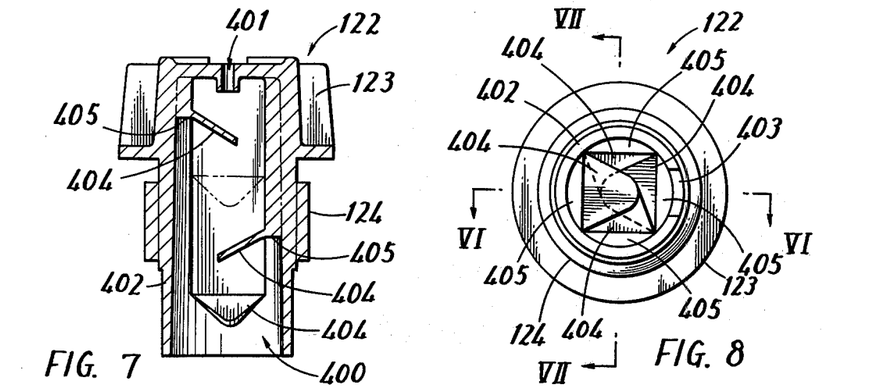
FIG. 7 is a cross-sectional view taken along a line VIII — VIII of FIG. 8.
FIG. 8 is a bottom view thereof.

FIGS. 6, 7 and 8 each show another embodiment of the present invention, each showing the illustrated view of the electrolyte-hole plug. FIG. 6 is a cross-sectional view taken along a line VI — VI of FIG. 8. FIG. 7 is a cross-sectional view taken along a line VII — VII of FIG. 8. FIG. 8 is a bottom view thereof. In the description of the embodiment shown, the same reference characters are used for the portions where the functions by way of the gas discharging passage are the same.

Referring to FIGS. 6, 7 and 8, the electrolyte-hole plug 122 is a cylindrical body which is provided, in its head portion, with a knob portion 123, the top end face being closed except a through-hole 401. A male screw portion 124 (not shown) with threads is formed in the middle portion of the cylindrical portion 402 to engage the electrolyte hole 121 (FIG. 1) of the storage battery. Slit 403, tongue-like pieces 404, . . . and storage portions 405, . . . are provided in the cylindrical portion 402 with the same object, construction and molding method as in the embodiment of FIGS. 1 through 5.

The same effects as in the embodiment can be obtained by the above described embodiment. Also, only if the gas discharging passage is formed in the plug for electrolyte hole, the advantages of the present invention can be provided simply by replacing the electrolyte-hole plug with that of the existing storage battery.

The molding method of the gas discharging passage 400 employed in the two embodiments will be described hereinafter. First, the gas discharging passage of the present invention is molded integrally and simultaneously with a molding material of a proper elasticity. Namely, the molding method of the gas discharging passage is performed by the best use of the elasticity of the molding material provided when the material has been solidified substantially. As a specific example of the molding material, it is preferable to have olefin resin such as polyethylene or polypropylene, or a synthetic rubber, or a mixture thereof. It is preferable particularly to have polypropylene or the mixture thereof from a standpoint of oil resistance, chemical resistance and thermal resistance.

Figure 9:
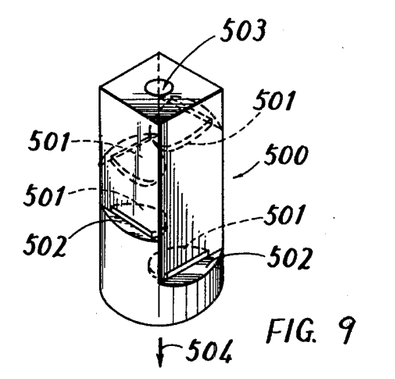
FIG. 9 shows a metallic mold used for molding a gas discharging passage 400 as shown in FIGS. 1 through 8, which shows a perspective view of a male mold defining the inner side shape of a cylindrical portion 402.

FIG. 9 is a perspective view of a metallic mold for molding the gas discharging passage 400, which shows a male mold defining the inner side shape of the cylindrical portion 402. FIGS. 10 to 13 show a cross-sectional view for illustrating the molding processes. Referring to FIG. 9, the male mold 500 of the gas discharging passage 400 is shaped to correlate to the inner side shape of the cylindrical portion 402, and is provided with the gap portions 501 for forming the tongue-like pieces 404, and the stage portions 502 for forming the stage portions 405. Referring to FIG. 9, a circular concavely-formed portion 503 formed in the head face is provided to form a cylindrical projected portion which defines the lower portion of the through-hole 401 in the electrolyte-hole plug 122 shown in FIGS. 6 and 7. As shown in FIGS. 3 and 4, the concavely-formed portion 503 is not required to be formed when the cylindrical projected portion is not formed. The resin is injected into the closed space which is defined by the male mold 500 and a plurality of proper female molds (not shown) to release the metallic mold after lapse of a given time period. The releasing operation of the metallic mold starts when the molding material has been solidified substantially. Particularly, when, for example, the polypropylene is used as a molding material, it is preferable to select, for releasing the metallic mold, and particularly, the male mold 500, a time point when the fluidity of the resin has disappeared in the hardening process of the resin but the resin is still soft properly at high temperature, instead of a condition when the polypropylene has been hardened through the complete balancing thereof to room temperature. The molding method of this invention is characterized by a method of releasing the male mold 500 from the molding. The method thereof will be described hereinafter sequentially with reference to FIGS. 10 to 13.

Figure 10:
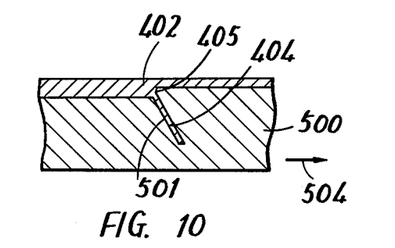
FIGS. 10, 11, 12 and 13 are cross-sectional views for illustrating the molding processes of the gas-discharging passage 400 shown in FIGS. 1 through 8.
Figure 11:
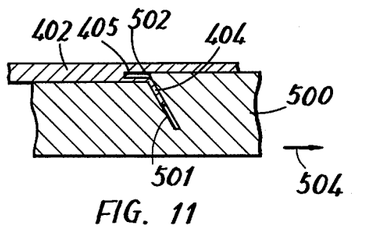
Figure 12:
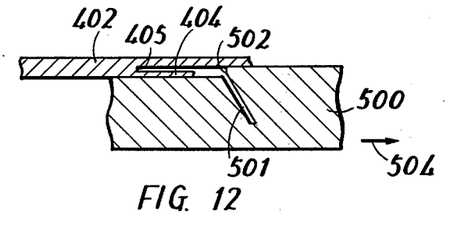
Figure 13:
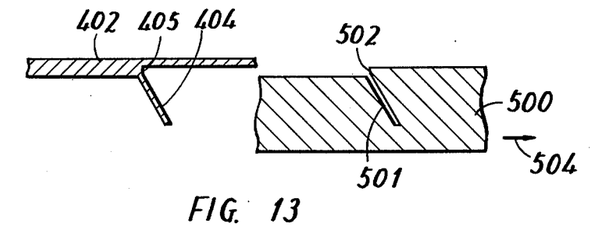

FIG. 10 shows a process wherein the resin is poured for molding the cylindrical portion 402, the female mold (not shown) is released, and the male mold 500 is released. The portions which correspond to the tongue-like piece 404 and the stage portion 405 are formed through the defining operation by the male mold 500. In order to release the male mold 500 from the cylindrical portion 402, the male mold 500 is pulled out in the direction of an arrow 504. In accordance with the pulling-out operation of the male mold 500, such a condition as shown in FIG. 11 is realized. The pulling-out operation of the male mold 500 is effected through the use of the elasticity of the molding material with which the tongue-like piece 404 is made. The tongue-like piece 404 is deformed and received into space which is formed through separation of the stage portion 405 and the stage portion 502, allowing the male mold 500 to be pulled out advantageously in the direction of an arrow 504. As shown in FIG. 12, the tongue-like piece 404 is pulled out from the space portion 501 completely and comes into sliding contact with the male mold 500 with the tongue-like piece 404 being accommodated in the space formed between the stage portion 405 and the stage portion 502. When the tongue-like piece 404 is varied as shown in FIGS. 11 and 12, the diameter of the cylindrical portion 402 is extended although the extension is slight (not shown) so that the male mold 500 may be pulled out more advantageously. As shown in FIG. 13, the tongue-like piece 40 is restored to its desired shape elastically after the male mold 500 has been pulled out from the cylindrical body 402. Thus, the gas discharging passage 400 as in the embodiment as described hereinabove is obtained. The female mold described hereinafter (not shown) is judged easily from the gas discharging passage 400 of the cover 100 and its vicinity, or the outer shape of the plug for electrolyte hole 122.

Figure 14:
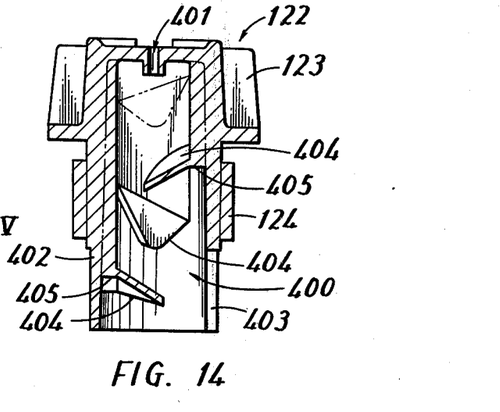
FIG. 14 is a cross-sectional view taken along a line XIV — XIV of FIG. 15
Figure 15:
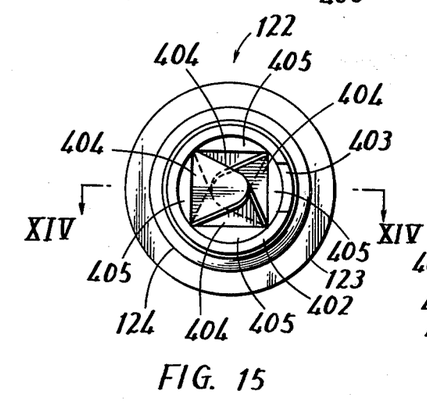
FIG. 15 is a bottom view thereof.

FIGS. 14 and 15 show a modified version of FIGS. 6 to 8. FIG. 14 is a cross-sectional view taken along a line XIV — XIV of FIG. 15. FIG. 15 is a bottom view thereof. FIGS. 14 and 15 use the same reference characters for the corresponding parts for facility of understanding of comparison thereof with FIGS. 6 to 8. This embodiment is characterized by the arranging embodiment of the tongue-like piece 404. Namely, in this embodiment, the mounting portion of the tongue-like piece 404 with respect to the cylindrical portion 402 inner face of the tongue-like piece 404 is inclined. For example, the mounting portion is formed along spiral track.

According to the above embodiment, the electrolyte which drips along, particularly, the inner face of the cylindrical portion 402 or the tongue-like piece 404 is introduced more smoothly. In the molding process, the pulling-out operation by the use of the elasticity of the material resin will be effected more easily.

The foregoing description is provided about the electrolyte-hole plug. The same is applicable even to the gas discharging passage which is directly provided in the cover shown in FIGS. 1 to 5. The above description is provided about a first typical embodiment of the present invention.

A second typical embodiment of this invention will be described hereinafter. The embodiment described hereinafter can be also applicable, unless otherwise pointed out, to the gas discharging passage provided directly in the cover of the elastic cell of the storage battery or to the gas discharging passage provided in the electrolyte-hole plug, respectively.

Figure 16:
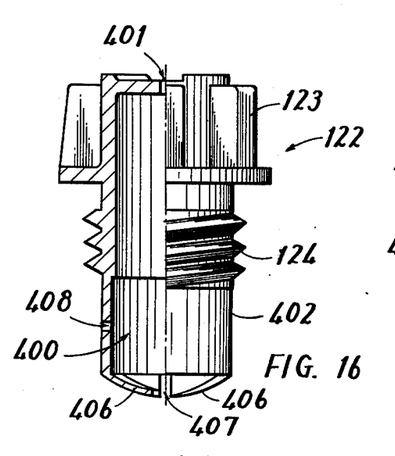
FIG. 16 is a front view of the plug for electrolyte hole, showing one portion of the plug in a vertical sectional view for illustrating the embodiment.
Figure 17:
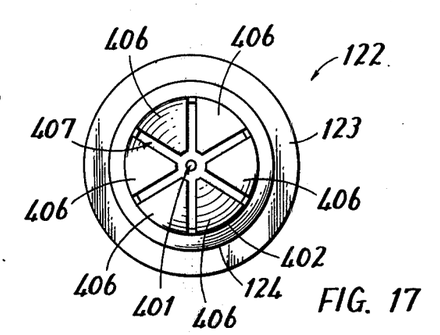
FIG. 17 is a bottom view thereof.

FIGS. 16 and 17 each show the second typical embodiment of this invention. FIG. 16 is a front view of the electrolyte-hole plug, showing a partial vertical sectional view of the electrolyte-hole plug for describing the embodiment. FIG. 17 is a bottom view thereof. FIGS. 16 and 17 use the same reference characters for the corresponding parts for simplicity of comparison thereof with FIGS. 6 to 8. Only the different portions among them will be described hereinafter.

In the embodiment shown here, special consideration is given so that the bottom end face of the cylindrical portion 402 which becomes an entrance to the gas discharging passage 400 may be closed advantageously and the manufacturing process may be simplified. Referring to FIGS. 16 and 17, the screening members are not provided on the inside of the cylindrical portion 402. A plurality of tongue-like screening members 406, . . . (six screening members in the embodiment) which are each projected from the end edge of the cylindrical portion 402 to the central direction thereof so that the bottom end face of the cylindrical portion 402 may be substantially closed. The screening members 406, . . . are curved and projected from the bottom end face of the cylindrical portion 3 to form convex face (shown in FIG. 16). Gaps 407 are formed, along the outer edges of the screening members 406, among the screening members 406. The gaps are provided as the gas discharging passage or to prevent the electrolyte from remaining in the cylindrical portion 3. Furthermore, the gaps are an indispensable requirement in the construction of the male mold during the molding process (described later). A proper through-hole 408 is formed in the side face of the cylindrical portion 402 and has the same function as the above described slit 403 (for example, see FIG. 6) and advantageously acts as the gas passage when the electrolyte has closed the lower end face of the cylindrical portion 402.

The gas discharging passage 400 of the electrolyte-hole plug 122 shown in FIGS. 16 and 17 is manufactured substantially through the same molding method as the molding method of the gas discharging passage 400 which is provided with the above-described tongue-like piece 404. Namely, the method of releasing the male mold for molding the gas discharging passage 400 is as follows; the male mold which correlates to the inner shape of the cylindrical portion 402 has hollow portions correlating to the screening members 406, . . . In the molding process, the resin is injected into the space defined by a proper female mold and this male mold. After the lapse of a given time period, the male mold is pulled out. The elasticity of the resin is somewhat used to pull out the shape portion which correlates to the screening member 406. Accordingly, when the polypropylene is used here, it is preferable to pull out the male mold at a time point when the fluidity has disappeared during the hardening process of the resin but the resin is still properly soft at high temperature. After the male mold has been pulled out in this manner, the screening member 406 portion is restored to its desired condition due to its elasticity, thus realizing such condition as shown in FIGS. 16 and 17. The male mold used here has a space portions shaped to correlate to such screening members 406, . . . as described hereinabove. Accordingly, the male mold has a coupling portion shaped to correlate to the gaps 407 which are formed between the screening members 406, . . . The gap 407 is advantageous to be as small as possible, considering the electrolyte leakage, etc., and should be determined from the strength of the male mold which depends upon the cross-sectional area of the above-described coupling portion.

According to the embodiment, effective shutting-off is provided with respect to the bottom end face of the cylindrical portion 402 which becomes the entrance to the gas discharging passage 40, thus preventing the electrolyte from leaking, and the electrolyte from remaining.

FIGS. 16 and 17 show a case where the gas discharging passage is provided in the electrolyte-hole plug. The gas discharging passage can be also provided directly in the cover of the electric cell of the storage battery.

In the second typical embodiment of the above-described typical embodiment, various modified versions are considered. These modifications are provided to further improve the effects of preventing the electrolyte leakage, etc. Various modifications will be described hereinafter.

Figure 18:
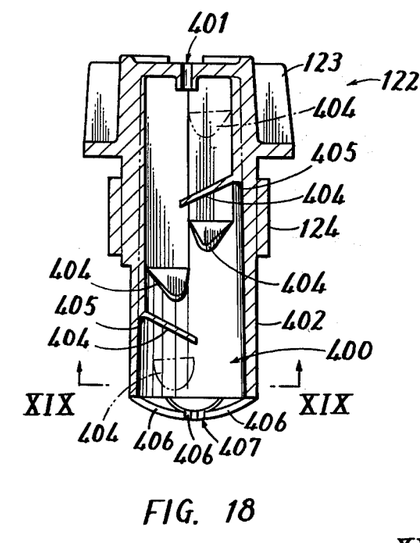
FIG. 18 is a cross-sectional view taken along a line XVIII — XVIII of FIG. 20.
Figure 19:
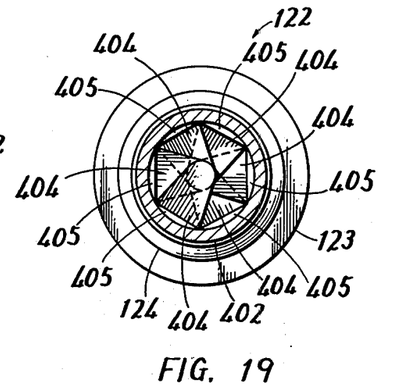
FIG. 19 is a sectional view taken along a line XIX — XIX of FIG. 18
Figure 20:
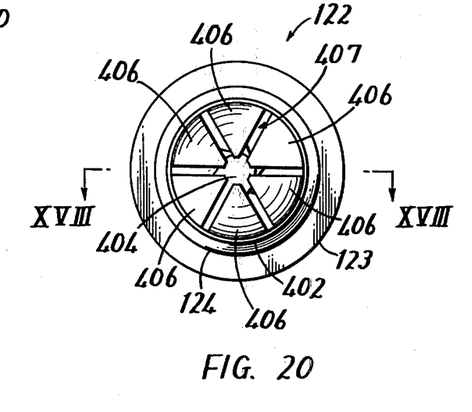
FIG. 20 is a bottom view thereof.

FIGS. 18, 19 and 20 each show a first modification. FIG. 18 is a cross-sectional view taken along a line XVIII—XVIII of FIG. 20. FIG. 19 is a cross-sectional view taken along a line XIX — XIX of FIG. 18. FIG. 20 is a bottom view thereof. An embodiment described here corresponds to the mixture of a second typical embodiment and a first typical embodiment. The reference characters used in FIGS. 18 to 20 are the same as those of the first and second typical embodiments for simplicity of comparsions among them.

The embodiment of the first modification will be described hereinafter briefly. A hexagonal portion in section is included on the inner side of the cylindrical portion 402 of the electrolyte-hole plug 122. Tongue-like pieces 404, . . . are alternately provided respectively on six faces in an approximately hexagonal-pillar-like space formed here. The tongue-like pieces 404 are provided to direct downwardly by, for example, 30° from the vertical direction with respect to the inner face of the cylindrical portion. The six tongues 404, . . . are projected selectively so that they may overlap each other partially but they are not in contact with each other. The overlapping condition of the six tongue-like pieces are shown, particularly, in FIG. 19. Accordingly, the straight-line passage, along the axial direction, of the electrolyte-hole plug 122 is shut off. The faces leading from the respective roots of the tongue-like pieces 404 to the lower portion are cut to proper depths, forming the stage portions 405 there.

The construction described hereinabove is the same as the construction in the description of the first typical embodiment, with the exception of the specific description and the number of the tongue-like pieces 404.

It is preferable in terms of electrolyte leakage prevention that the arranging positions of the tongue-like pieces 404, . . . are selected to cover the gap 407 between the screening members 406 which are projected to close the bottom end face of the cylindrical portion 402 as shown in FIG. 20.

In the molding process, the plug for electrolyte hole 122 is also made of olefin resin, etc. of proper elasticity such as polyethylene and polypropylene. In the molding operation of the electrolyte-hole plug 122, the male mold is provided with portions shaped to correlate to the screening members 406, . . . and the tongue-like pieces 404, . . . The male mold is pulled out, being slightly against the elastic force of the resin. At this time, the stage portions 405, . . . act advantageously as the relief of the tongue-like pieces 404, . . . After the male mold has been pulled out, the screening members 406 and the tongues 404 are restored to their desired conditions elastically, thus realizing such condition as shown in FIG. 18.

According to the embodiment of the above-described first modification, no straight line passage is provided, due to the tongue-like pieces 404, from the lower end face of the cylindrical portion 402 to the through-hole 401 in the gas discharging passage 400. Also, in the lower end face of the cylindrical portion 402, the screening members 406 effectively shut off the lower end face effectively which becomes an entrance to the electrolyte leakage. Also, the electrolyte-hole plug 122 is high in productivity, since it can be manufactured only in one molding process and no assembling process, etc. are required.

The embodiment of the first modification is applicable to the gas discharging passage, which is provided not only in the electrolyte opening plug, but also directly in the cover. The same effect can be provided.

Figure 21:
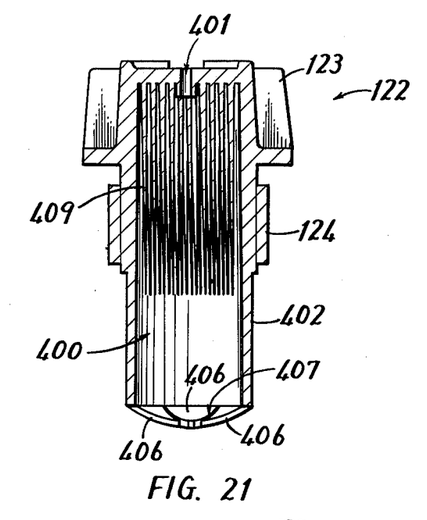
FIG. 21 is a cross-sectional view taken along a line XXI — XXI of FIG. 22
Figure 22:
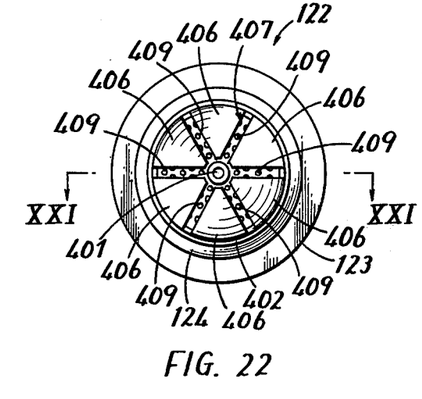
FIG. 22 is a bottom view thereof.

The second modification will be described hereinafter. FIGS. 21 and 22 show an electrolyte-hole plug for illustrating the second modification. FIG. 21 is a cross-sectional view taken along a line XXI — XXI of FIG. 22. FIG. 22 is a bottom view thereof. The reference characters used here are same as those of FIGS. 16 and 17, the description of the same portions being omitted. The different construction therebetween will be described hereinafter. A plurality of hair-like materials 409 are provided as close as possible on the inside of the cylindrical portion 402. The hair-like materials 409 are projected from the lower face side of the upper end face on a knob portion 123 and are directed downwardly of the cylindrical portion 402. The hair-like materials 409 are collected just like that of a brush. The hair-like materials 409 are molded integrally with, for example, the plug for electrolyte hole 122. Accordingly, the hair-like materials 409 are made of, for example, olefin resin, etc. The electrolyte which tries to scatter in the direction of the through-hole 401 is effectively repelled, due to moisture-resistance of the materials and superior drainage property of the mass, in the lower end portion (which is surface-shaped) of the mass of the hair-like materials, thus keeping the bulk of the hair-like materials 409 dry all the time. As the electrolyte goes into the gaps among the hair-like materials 409, it is immediately repelled to the lower end portion, from which it will drip. Also, as, for example, the olefin resin has proper elasticity, the hair-like materials 409 will not break if they are formed to bend due to some causes.

According to the embodiment of the above-described second embodiment, the electrolyte leakage caused due to the scattering operation of the electrolyte can be prevented and no electrolyte remains at all. The electrolyte leakage can be prevented on the whole surface. Also, the manufacturing process is simple and economical.

In this embodiment, the hair-like materials 409 may be formed through the integral molding operation thereof with the electrolyte-hole plug 122. A proper board-like member with the hair-like materials disposed thereon is provided individually to engage it with the electrolyte opening plug 122 through processes of glueing, heat deposition, engaging fitting, etc.

The above-described embodiment of the second modification is applicable to the gas discharging passage, etc. which are provided in not only the electrolyte-hole plug, but also directly in the cover. The same advantage can be achieved.

Figure 23:
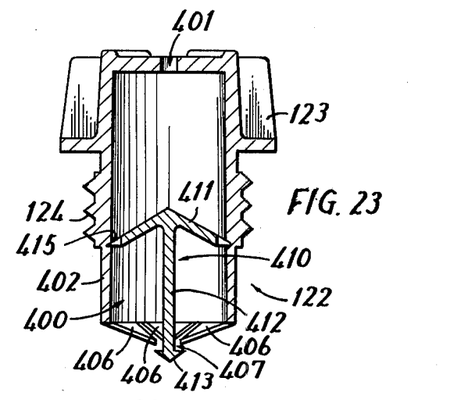
FIG. 23 is a cross-sectional view taken along a line XXIII — XXIII of FIG. 24
Figure 24:
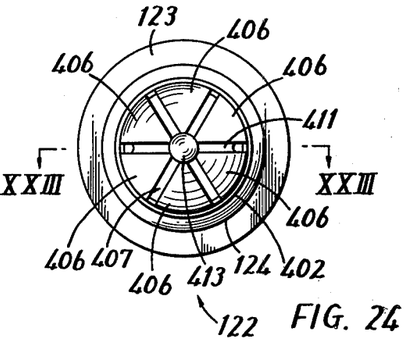
FIG. 24 is a bottom view thereof.

The third modification will be described hereinafter. FIGS. 23 and 24 show an electrolyte-hole plug for illustrating the third modification. FIG. 23 is a cross-sectional view taken along a line XXIII — XXIII of FIG. 24. FIG. 24 is a bottom view thereof. The reference characters used here are the same as those in FIGS. 16 and 17. Only the construction of the different portion will be described hereinafter.

Figure 25:
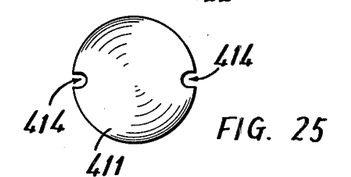
FIG. 25 is a top face view thereof.
Figure 26:
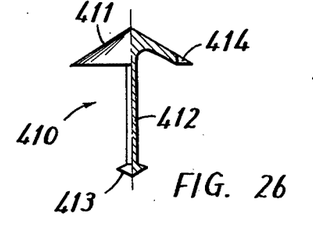
FIG. 26 is a partially cross-sectional view thereof and FIG. 27 is a bottom view thereof.
Figure 27:
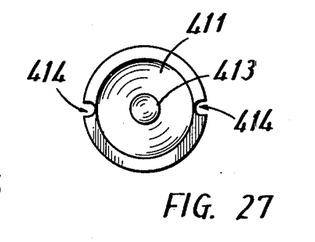

FIGS. 25, 26 and 27 show an umbrella-shaped member used in the embodiment of the third modification being described. FIG. 25 is a top face view thereof. FIG. 26 is a partially vertical sectional view. FIG. 27 is a bottom view thereof. Referring to FIGS. 23 to 27, an umbrella-shaped member 410, which serves as a second screening member, is accommodated inside the cylindrical portion 402 to prevent the electrolyte from being scattered. The umbrella-shaped member 410 is preferably made of olefin resin. As shown in detail in FIGS. 25 to 27, the umbrella-shaped portion is composed of an upper hat portion 411, a shaft 412 and a pointed end portion 413, which is formed in the lower end of the shaft 412. The hat portion inclines downwardly towards the outer periphery of the hat from the center thereof. Notches 414 and 414 are formed on the outer peripheral end edge. Such umbrella-shaped member 410 as described hereinabove is accommodated inside the cylindrical portion 402 as described hereinabove. At this time, the outer diameter of the hat portion 411 is selected slightly larger than the inner diameter of an engaging groove 415 which is provided, in a ring shape, on the inner peripheral wall face of the cylindrical portion 402. Thus, the umbrella-shaped member 410 is securely accommodated inside the cylindrical portion 402 by the elasticity caused through the engagement of the outer periphery of the hat portion 411 with the engaging groove 415. At this time, the pointed end portion 413 of the shaft 412 is adapted to project further downwardly beyond the screening members 406, . . . which are projected from the bottom end portion of the cylindrical portion 402. Also, an extremely small gap is formed among the outer peripheral side face of the shaft 412 and the front ends of the screening members 406, . . . The screening member 406 illustrated here is not curved in projection as in the embodiments described hereinabove, but projects straight. This fact has no special significance. It is to be understood to the effect that such shape as described hereinabove can be formed.

According to the embodiment of the above-described third modification, the electrolyte scattering which the screening members 406 could not prevent from being leaked is shut off by the under face on the hat portion 411 of the umbrella-shaped member 410. Furthermore, the electrolyte which reached the top face of the hat portion 411 is introduced along the inclined face of the hat portion 411. Then, the electrolyte drips through the notches 414 and 414 of the outer peripheral edge. The electrolyte which has been shut off and guided by the hat portion 411 is collected effectively by means of the 412 and drops, along the shaft 412, into the electric cell again. In this case, as the lower end 413 of the shaft 412 is pointed, the electrolyte dripping along the shaft 412 is adopted to drop faster.

Figure 28:
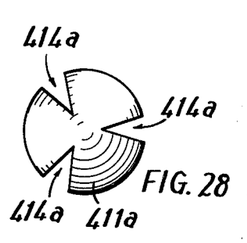
FIG. 28 is a top view thereof.
Figure 29:
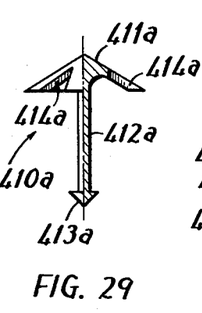
FIG. 29 is a partially cross-sectional view thereof and FIG. 30 is a bottom view thereof.
Figure 30:
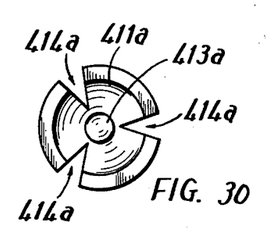

Other various embodiments are provided about the umbrella-shaped member which is used in the embodiment of the third modification being described. FIGS. 28, 29 and 30 show the other embodiments of the umbrella-shaped member. FIG. 28 is a top face view thereof. FIG. 29 is a partial cross-sectional view thereof. FIG. 30 is a bottom view thereof. The umbrella-shaped member 410a is different from the umbrella-shaped member 410 shown in FIGS. 25 to 27 in the following points. Namely, V-shaped notches 414a, . . . which are different from the notches 414 of the hat portion 411 are formed in the hat portion 411a. The V-shaped notches 414a are preferred to be positioned not to overlap each other or not to correspond to the gap 407 of the screening members 406, . . . which are formed on the lower end face of the cylindrical portion 402. In other words, the straight-line passage which reaches from the lower end face of the cylindrical portion 402 to the top face of the hat portion 411a is adapted not to be formed.

According to this embodiment, the outer diameter of the hat portion 411a is made larger slightly than the inner peripheral diameter of the cylindrical portion 402 to provide better stability during the positioning operation, since the elasticity of the hat portion 411a acts towards the engaging groove 415 of the cylindrical portion 412 more effectively. At the same time, the accommodating operation of the hat portion into the cylindrical portion 402 is simplified as compared with the accommodating operation thereof in the umbrella-shaped member 410.

In the further embodiment of the umbrella-shaped umbrella, the portion corresponding to the hat portion 411 or 411a may be inclined downwardly towards its center from outer periphery edge.

Figure 31:
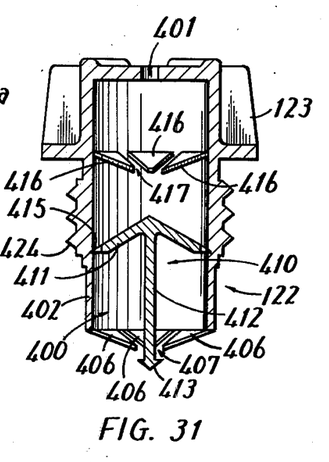
FIG. 31 is a vertical sectional front view showing the plug for electrolyte hole for illustrating a fourth modified version.

A fourth embodiment thereof will be described hereinafter. FIG. 31 is a vertical sectional front view showing the electrolyte-hole plug for illustrating the fourth modfication. The fourth modification is similar to the third modificaton. The same reference characters are used for the corresponding portions, the description thereof being omitted. Only the different construction between them will be described hereinafter.

On the inner face of the cylindrical portion 402 of the electrolyte-hole plug 122, six third screening members 416, . . . , each being similar, in shape, to the screening member 406 extend to the center from the inner wall with gap 417 provided among the screening members 416. The screening members 416 are inclined to project slightly downwarfdly in the center as the screening members 406 are. The third screening members 416, . . . may be arranged so that they may each correspond to the screening members 406 or they may be shifted with respect to each other, i.e. they may be overlapped partially.

The third screening members 416 which were provided newly are formed through the basically same molding process as the tongue-like pieces 404 which are described in the first typical embodiment. Accordingly, no illustration is provided for molding of the third screening member 416. It is preferable to have portions which are shaped to correspond to the stage portions 405, in the root portions of the screening members 416.

According to the embodiment of the fourth embodiment, the third screening member 416 is added to the embodiment of the third modification and thus the screening effect is further improved. The number of the molding processes remain the same in spite of the addition of the screening members 16.

The fifth modification will be described hereinafter. The fifth modification, which is different from the modifications described hereinabove, is applicable only to a case where the gas discharging passage is provided in the electrolyte-hole plug. This modification is characterized in the construction of the electrolyte opening 121 (see FIGS. 1 and 2) for receiving the electrolyte-hole plug 122. Fundamentally, the electrolyte-hole plug may be any one of the second typical embodiment. The characteristic construction of the electrolyte hole 121 will be described hereinafter.

Figure 32:
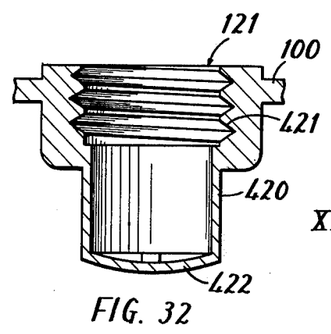
FIG. 32 is a cross-sectional view taken along a line XXXII — XXXII of FIG. 33
Figure 33:
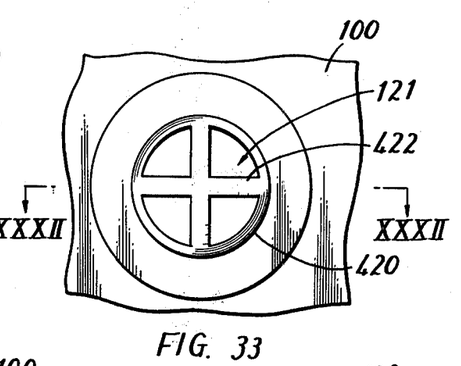
FIG. 33 is a bottom view thereof.

FIGS. 32 and 33 each show one embodiment of such electrolyte hole 121 as described hereinabove. FIG. 32 is a cross-sectional view taken along a line XXXII — XXXII of FIG. 33. FIG. 33 is a bottom view thereof. Referring to FIGS. 32 and 33, a cylindrical portion 420 which forms the electrolyte hole 121 is provided in the proper location of the cover 100 of the storage battery cell. A female screw shaped portion 421 is formed in the upper portion of the cylindrical portion 420 to engage the male screw-shaped portion 124 of the above-described electrolyte-hole 122. The lower end face of the cylindrical portion 420 is closed, in its given portion, due to screening members 422, each extending along its diametral direction to meet at right angles with each other. Particularly, it is important that the central position and its vicinity of the lower end face of the cylindrical portion 420 are closed by the screening members 422.

Figure 34:
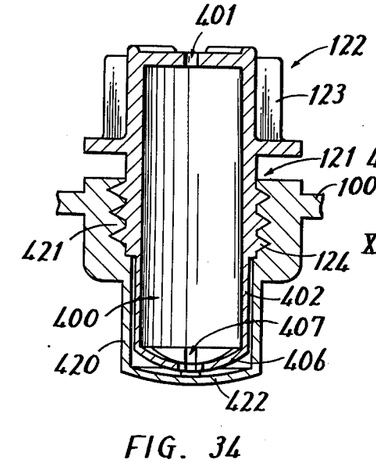
FIG. 34 is a cross-sectional view taken along a line XXIV — XXXIV of FIG. 35
Figure 35:
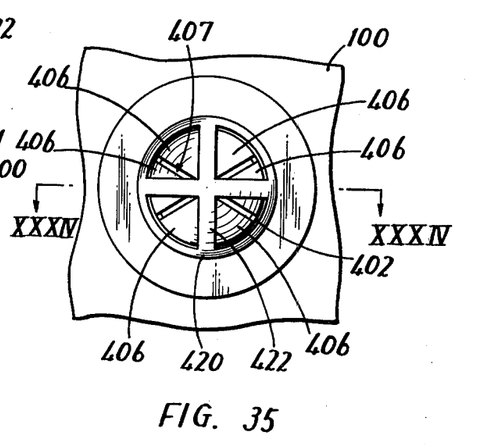
FIG. 35 is a bottom view thereof.

FIGS. 34 and 35 show a condition where the electrolyte hole 121 is closed by the electrolyte-hole plug 122. FIG. 34 is a cross-sectional view taken along a line XXXIV — XXXIV of FIG. 35. FIG. 35 is a bottom view thereof. Referring to FIGS. 34 and 35, the screening member 422 on the cylindrical portion 420 side is positioned to cover at least the central location and its vicinity of the gap 407 which is formed among the screening members 406, ... of the electrolyte-hole plug 122 when the plug for electrolyte hole 122 has closed the electrolyte hole 121. It is preferable that the leading end of the screening member 406 comes into light contact with the screening member 422, or slight gap is provided between them. When the electrolyte-hole plug 122 has been engaged in this manner, the lower end portion of the gas discharging passage 400 is closed advantageously by the screening member 422 and particularly the straight-line passage leading to the through-hole 401 is closed. Also, no electrolyte remains.

Figure 36:
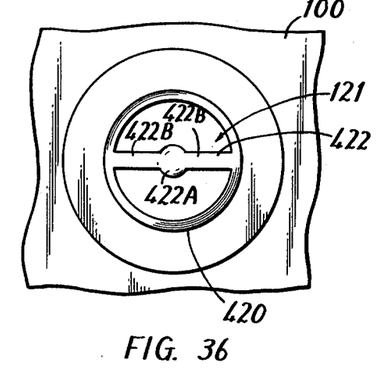
FIGS. 36 and 37 each are bottom views, showing another embodiment of the electrolyte hole 121.
Figure 37:
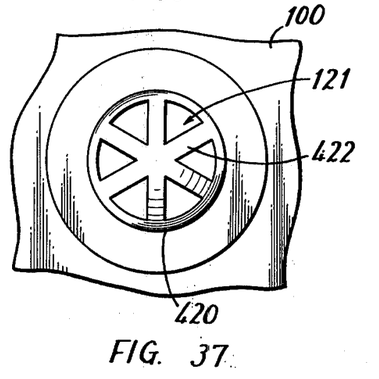

FIGS. 36 and 37 each are bottom views showing the other embodiment of the electrolyte hole 121. FIGS. 36 and 37 each are views corresponding to the above-described FIG. 33. The same reference characters are provided for the corresponding portions. In the embodiment of FIG. 36, the screening member 422 is provided only on a portion where it is required at least to minimum. Namely, the screening member 422 is composed of a portion 422A which closes the central position and its vicinity of the lower end face of the cylindrical portion 420, and portions 422B and 422B each supporting the portion 422A. The embodiment of FIG. 37 shows a case where the screening center 422 is selected to a shape correlating to the entire portion of the gap 407 which is produced by the screening member 406, of the electrolyte-hole plug 122. In the embodiment, six screening members 406, ... are provided. The shape of the screening members 422 are selected so that each of them may extend at its diametral direction to meet an angle of 60° with each other. In this embodiment, special consideration is required so that the gap may be formed between the screening members 406 and the screening members 422. Accordingly, screening members 406 and the screening members 422 are arranged not to come into contact with each other, or only the leading ends of the screening members 406 are arranged to come into contact with the screening members 422. Also, it is preferable to arrange so that the screening member 422 may cover the gap 407 when the electrolyte-hole plug 122 has been engaged with the cylindrical portion 420 finally. Accordingly, it is required to define the final position of the screwing operation of the electrolyte-hole plug 122. For example, it is necessary to provide a stopper or to put a mark. According to the embodiment of FIG. 37, all the straight-line passage extending along the axial direction of the electrolyte-hole plug 122 is shut off. Accordingly, the effect of the preventing the electrolyte leakage is further improved.

As described hereinabove, in the second typical embodiment, a fundamental embodiment and an embodiment which is composed through addition of various constructions to the fundamental one are provided. In addition to them, modifications using the second typical embodiment are proposed variably. However, the description thereof will not be provided.

The third typical embodiment of the present invention will be described hereinafter. The embodiment to be described hereinafter is also applicable equally, unless otherwise pointed out, to the gas discharging passage directly provided in the cover of the storage battery cell or the gas discharging passage provided in the electrolyte-hole plug.

Figure 38:
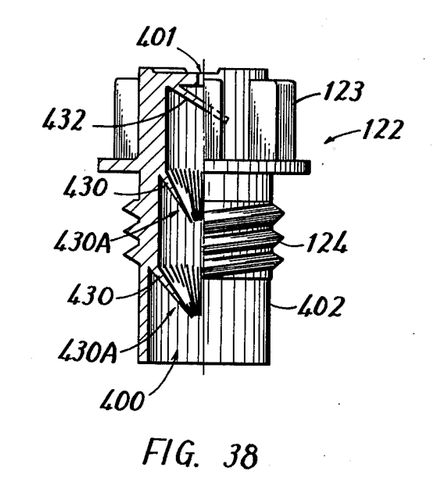
FIG. 38 is a front view of the plug for electrolyte hole, showing one portion thereof in a vertical sectional view
Figure 39:
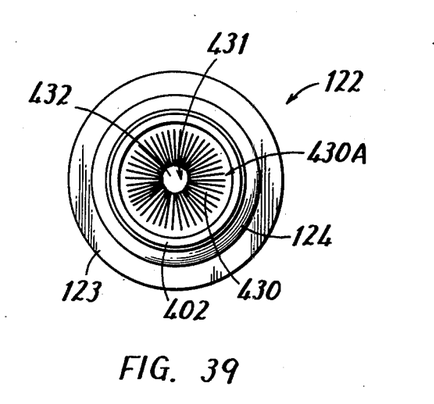
FIG. 39 is a bottom view thereof.

FIGS. 38 and 39 show the electrolyte-hole plug for illustrating the third typical embodiment of this invention. FIG. 38 is a front view thereof, showing one portion of the electrolyte in vertical section. FIG. 39 is a bottom view thereof. The same reference characters are used for the corresponding components for simplicity of understanding of comparison between the respective typical embodiments. The different construction therebetween will be described hereinafter.

A plurality of the hair-like materials 430 are inclined inwardly and downwardly from the given height position of the inner peripheral face of the cylindrical portion 402. The plurality of hair-like materials 430 are disposed as close as possible and are formed in the shape of a comb, the mass 430A of the hair-like materials 430 being funnel-shaped. It is preferable that the mass 430A of such hair-like materials 430 should be provided by a plurality of stages, being changed in height position, on the inner peripheral face of the cylindrical portion 402. In this embodiment, the mass is provided by two stages. The mass 430A of the hair-like materials 430 has a through-hole shaped portion 431 which is formed through the close stretching of the front end portions of the hair-like materials 430. The through-hole shaped portion 431 is formed to discharge the gas or to prevent the electrolyte from remaining in the cylindrical portion 402, and furthermore is an indispensable requirement in the construction of the male mold for molding operation during the molding process to be described subsequently. In this embodiment, the respective through-holes 431 formed in the masses 430A, which are provided in a plurality of stages, are aligned on a straight line including the through-hole 401 so that a straight-line passage may be formed. It is preferable to provide a tongue-shaped screening member 432, which projects from the under face side of the top end face of a knob portion 123, inside the cylindrical portion 402. The screening member 432 extends to the portion under the through-hole 401, inclining downwardly. The screening member 432 advantageously shuts off the straight-line passage which leads from the through-hole shaped portion 431 to the through-hole 401.

The electrolyte-hole plug 122 is also molded integrally with the molding material of proper eleasticity. In the molding process the male mold which correlates to the inner face of the cylindrical portion 402 has a space portion which correlates to the hair-like materials 430 and the tongue-shaped screening member 432. Resin is injected into the space defined by a proper female mold and this male mold. After this lapse of a given time period, the male mold is pulled out. The portions which are shaped to correlate to the hair-like materials 430 and the screening member 432 are pulled out against the elasticity of the molding material. The hair-like materials 430 and the screening member 432 are deformed in such pulling-out direction of the male mold to allow the male mold to be pulled out during the pulling-out operation of the male mold. They are elastically restored to their desired conditions, thus realizing such conditions as shown in FIGS. 38 and 39. In order to facilitate the pulling-out operation of the male mold as described hereinabove, the inner peripheral face of the cylindrical portion 402 is formed in stages. The roots of the hair-like materials 430 are positioned (well represented in FIG. 38) on the rising face of the each stage (horizontal face). Accordingly, during the pulling-out operation of the male mold, each hair-like material 430 is deformed along the inner peripheral wall under the root thereof, forming a passage for the pulling-out operation of the male mold. This molding method is substantially similar to the molding methods in the first and second typical embodiments.

In this embodiment, the molding material is made of, for example, olefin resin, etc. Accordingly, the hair-like materials 430 are moisture-resistant due to the material nature. Furthermore, the mass 430A of the hair-like materials 430 has the nature of repelling the water due to the surface shape thereof. The electrolyte which trys to scatter to the through-hole 401 is repelled effectively by the mass 430A of the hair-like materials 430. In other words, the hair-like materials 430 are always kept dry. Also, as the mass 430A of the hair-like materials 430 has a large surface area, the scattering of the electrolyte is not only shut off, but also promotes the liquefaction of gasified electrolyte. Also, as the hair-like materials 430 incline downwardly, it is advantageous for the electrolyte to drip, and thus no electrolyte remains.

Various modifications are provided in the third typical embodiment of this invention. Although no illustration is provided in particular, the hair-like materials 430 or the mass 430A thereof which are characteristic in construction in the typical embodiment can be replaced by the tongue-like piece 404 in, for example, the first typical embodiment, or can coexist. Accordingly, modifications can be realized through the combination of various embodiments which are described in connection with the first and second embodiments.

As described hereinabove, in order to describe the invention, three typical embodiments and modified embodiments, which are related to them respectively, are provided. These embodiments mainly relate to the construction of the gas discharging passage itself. However, various embodiments are provided about the position where the gas discharging passage is provided. As described already, the gas discharging passage can be provided in the plug for electrolyte hole, or may be directly provided in the cover of the electric cell, unless otherwise pointed out. However, it is to be intended that it falls within the scope of this invention if the cylindrical portion (which is represented at reference character 402 in the description of the embodiment) which constitutes the gas discharging passage of this invention is provided in a row downwardly of the electrolyte hole for receiving the electrolyte-hole plug. In this case, the plug for electrolyte port, if it is simply hollow and cylindrical, will do. If only a small through-hole for discharging the gas is provided, in the upper end face, on the plug for electrolyte hole, no through-hole for discharging the gas is required to be provided in the cover. As described hereinabove, the above-described preferred embodiment of this invention is only illustrative. It is to be understood that the scope of this invention should be defined only by the accompanied claims.

What is claimed is:

1. A storage battery plug with a gas discharging passage which is integrally molded from a moldable material of substantial elasticity, including a cylindrical portion having a central axis and a given length, as well as screening members in said cylindrical portion, said screening members comprising a plurality of hair-like elements which are provided inwardly of the given length of the inner peripheral wall of said cylindrical portion, said hair-like elements being inclined downwardly and distributed closely together across the entire area along the peripheral direction so that the mass of said plurality of hair-like elements form funnel shaped means in said cylindrical portion.

2. The plug of claim 1, wherein said hair-like elements are arranged in a plurality of groups, each of said groups forming a respective funnel shape, said groups being spaced along said central axis on the inner peripheral wall surface of said cylindrical portion.

3. The plug of claim 1, wherein said cylindrical portion comprises shoulder means having a ring shape on the inner peripheral wall of said cylindrical portion, said hair-like elements extending downwardly from the respective shoulder means.

4. The plug of claim 1, wherein one end of said cylindrical portion is closed except for a hole for discharging gas, said plug further comprising substantially radially inwardly reaching integrally molded tongue shaped means interrupting or shutting off a straight line passage through said hole along said central axis, said tongue shaped means extending inwardly of said hole located below said one end.

5. The plug of claim 1, further comprising integrally molded screening members in the form of a plurality of wedges projecting substantially inwardly from the inner wall of said cylindrical portion towards said central axis.

6. The plug of claim 5, wherein said wedges comprise a group of pie shaped members substantially closing one end of said plug except for radially extending gaps separating said pie shaped members.

7. The plug of claim 1, wherein said moldable material includes an olefin resin.

* * * * *